US007804223B1

(12) United States Patent
Teowee

(10) Patent No.: US 7,804,223 B1
(45) Date of Patent: Sep. 28, 2010

(54) EFFICIENT PIEZOELETRIC-TRIGGERED TIME DELAY MODULE

(75) Inventor: Gimtong Teowee, Westlake Village, CA (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 420 days.

(21) Appl. No.: 11/787,377

(22) Filed: Apr. 16, 2007

Related U.S. Application Data

(63) Continuation of application No. 11/414,247, filed on Apr. 27, 2006, now abandoned.

(51) Int. Cl.
*H01L 41/04* (2006.01)
(52) U.S. Cl. .................................... 310/318; 310/339
(58) Field of Classification Search ............... 310/317, 310/318, 339; 333/141
See application file for complete search history.

(56) References Cited

U.S. PATENT DOCUMENTS

| | | | | |
|---|---|---|---|---|
| 3,337,758 A * | 8/1967 | Brothers | .................. | 310/319 |
| 4,648,320 A | 3/1987 | Fürst et al. | .................. | 102/210 |
| 5,092,243 A * | 3/1992 | Hawkins et al. | .................. | 102/210 |
| 5,133,257 A | 7/1992 | Jonsson | .................. | 102/210 |
| 6,079,332 A | 6/2000 | Marshall et al. | .......... | 102/202.5 |
| 6,389,135 B1 * | 5/2002 | Rahamim et al. | ............ | 379/412 |
| 6,679,179 B1 * | 1/2004 | Bohl et al. | .................. | 102/501 |
| 2005/0017602 A1 * | 1/2005 | Arms et al. | .................. | 310/339 |
| 2005/0206275 A1 * | 9/2005 | Radziemski et al. | ......... | 310/339 |
| 2007/0282378 A1 * | 12/2007 | Huang et al. | .................. | 607/2 |
| 2008/0238260 A1 * | 10/2008 | Xu et al. | .................. | 310/339 |

FOREIGN PATENT DOCUMENTS

JP  04-239187  *  8/1992

* cited by examiner

*Primary Examiner*—Walter Benson
*Assistant Examiner*—Derek J Rosenau
(74) *Attorney, Agent, or Firm*—Cantor Colburn LLP

(57) ABSTRACT

An efficient piezoelectric-triggered time delay module may be provided with separate firing and logic capacitors, and may also have corresponding separate piezoelectric transducers. Further, separate firing and logic capacitors may be impedance-matched to corresponding separate piezoelectric transducers. Optionally, the capacitors may be made of the same materials as the corresponding piezoelectric transducers. Further alternately or additionally, low-value, high-voltage rated capacitor(s) may be employed. Further alternately or additionally, the piezoelectric transducer(s) may be selected to offer high charge output within the intended operating temperature range. Further alternately or additionally, the piezoelectric transducer(s) may be constructed with multiple wafers.

18 Claims, 3 Drawing Sheets

EFFICIENT PIEZOELETRIC-TRIGGERED TIME DELAY MODULE

CROSS-REFERENCE TO RELATED APPLICATION

This application is a Continuation application of the U.S. non-provisional application Ser. No. 11/414,247 entitled "Efficient Piezoelectric-Triggered Time Delay Module" that was filed on Apr. 27, 2006 now abandoned. This application claims the benefit of the prior application Ser. No. 11/414,247 that has been abandoned.

FIELD OF THE INVENTION

The present invention relates primarily to the field of time delay modules for use in military and aerospace applications, and more particularly, to an efficient piezoelectric-triggered time delay module.

BACKGROUND OF THE INVENTION

Piezoelectric transducers have been used to trigger prior art time delay modules, such as in mining and blasting detonators. Examples include U.S. Pat. No. 5,133,257 to Jonnson, and U.S. Pat. No. 6,079,332 to Marshall et al., both of which are incorporated herein for their teachings of such use of piezoelectric transducers. The known prior art piezoelectric-triggered time delay modules are relatively inefficient in their piezoelectric transduction of electricity to the time delay module. Size limits on the time delay module limit the size of the piezoelectric transducer, which in turn limits the time delay module's maximum delay time and the initiator's permissible all-fire energy. Prior art piezoelectric-triggered time delay modules have thus generally employed low energy initiators (such as thin film bridgewire or a semiconductor bridge), which can be unreliable and unpredictable in their firing performance, prone to electrical and rf interference, and require relatively elaborate packaging and rigorous testing. There is thus a need for a piezoelectric-triggered time delay module that transduces usable electricity to the time delay module more efficiently.

SUMMARY OF THE INVENTION

In a first aspect of an efficient piezoelectric-triggered time delay module according to the present invention, the time delay module may be provided with separate firing and logic capacitors, so as to inhibit bleeding of the firing capacitor during counting of the delay time and facilitate its retention of a voltage above the initiator's all-fire voltage. In a second independent and separate aspect of an efficient piezoelectric-triggered time delay module according to the present invention having separate logic and firing capacitors, the capacitors may be matched with corresponding separate piezoelectric transducers, which transducers are preferably impedance-matched to the corresponding capacitors so as to result in enhanced energy transfer. (Optionally, this may be accomplished at least in part by making the capacitors of the same materials as the corresponding piezoelectric transducers, resulting in a close tracking of impedance over a range of temperatures). In a third independent and separate aspect of an efficient piezoelectric-triggered time delay module according to the present invention, low-value, high-voltage rated (>250V) capacitor(s) may be employed, so as to provide higher energy transfer efficiency from the piezoelectric transducer(s) to the capacitor(s). In a fourth independent and separate aspect of an efficient piezoelectric-triggered time delay module according to the present invention, the piezoelectric transducer(s) may be selected to offer high charge output within the intended operating temperature range. In a fifth independent and separate aspect of an efficient piezoelectric-triggered time delay module according to the present invention, the piezoelectric transducer(s) may be constructed with multiple wafers.

DETAILED DESCRIPTION OF A PREFERRED EMBODIMENT

Figure 1:
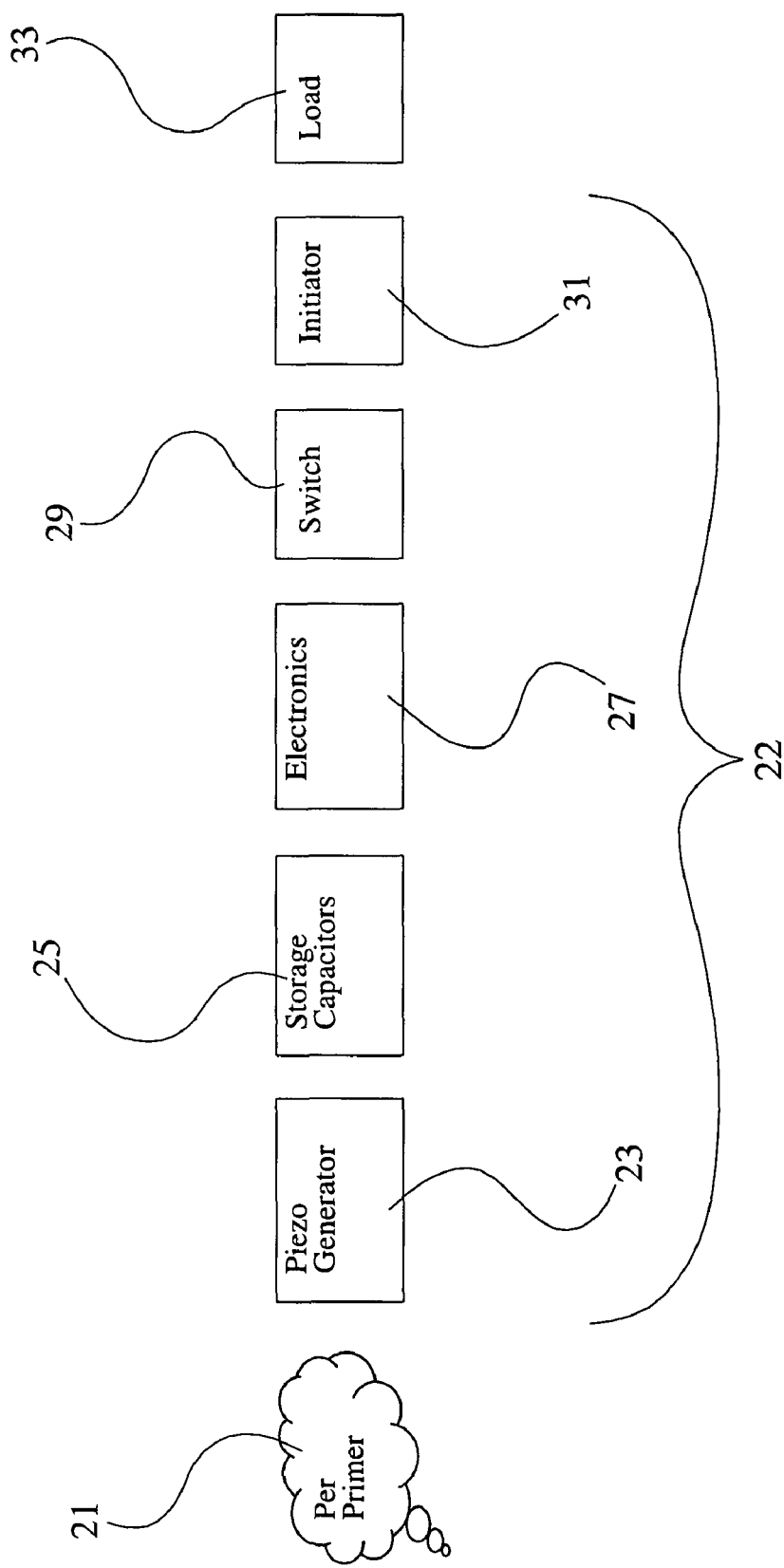
FIG. 1 is a schematic view of the components of a preferred embodiment of an efficient piezoelectric-triggered time delay module according to the present invention.

FIG. 1 schematically depicts the components of a preferred embodiment of an efficient piezoelectric-triggered time delay module 22 according to the present invention, which is triggered by an input 21 (such as a percussive primer, delivering a pressure of, e.g., 20,000 psi for 50 microseconds) and initiates a load 33 (which, depending on the application, delivers shock, pressure, or pyrotechnic output as desired). The basic components of the time delay module 22 are piezoelectric transducer(s) 23, storage capacitor(s) 25, control electronics 27, a firing switch 29, and an initiator 31. The time delay module 22 preferably accepts inputs identical to those accepted by existing pyrotechnic time delay devices. Using a primer or a shock input from a transfer line, the piezoelectric transducer(s) 23 is energized and charges the storage capacitor(s) 25, which power the control electronics 27 and (after the desired delay time has elapsed, whereupon the control electronics 27 open the switch 29) energize the initiator 31.

Figure 2:
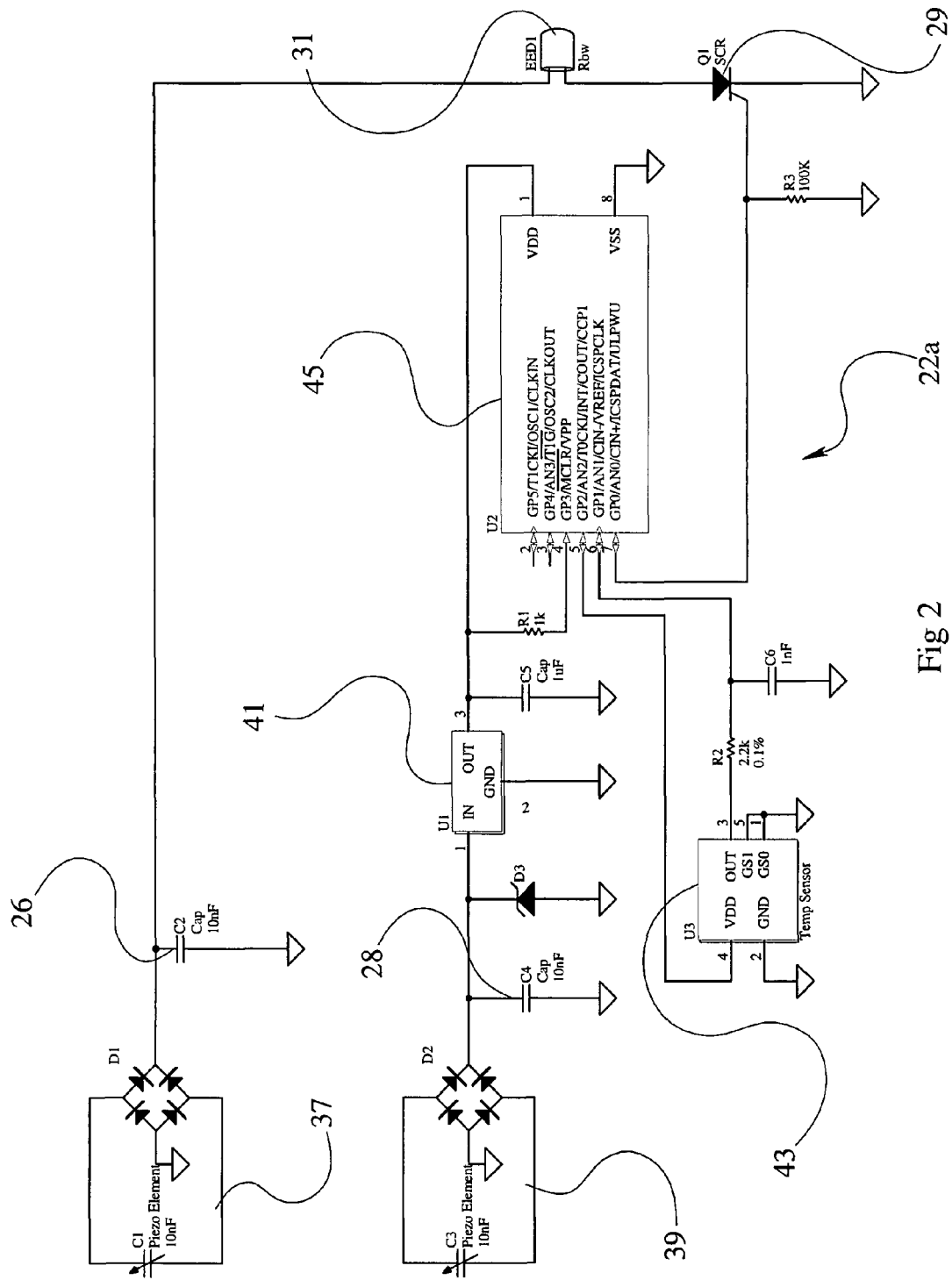
FIG. 2 is a schematic view of a preferred embodiment of the electronics for the time delay module of FIG. 1.
Figure 3:
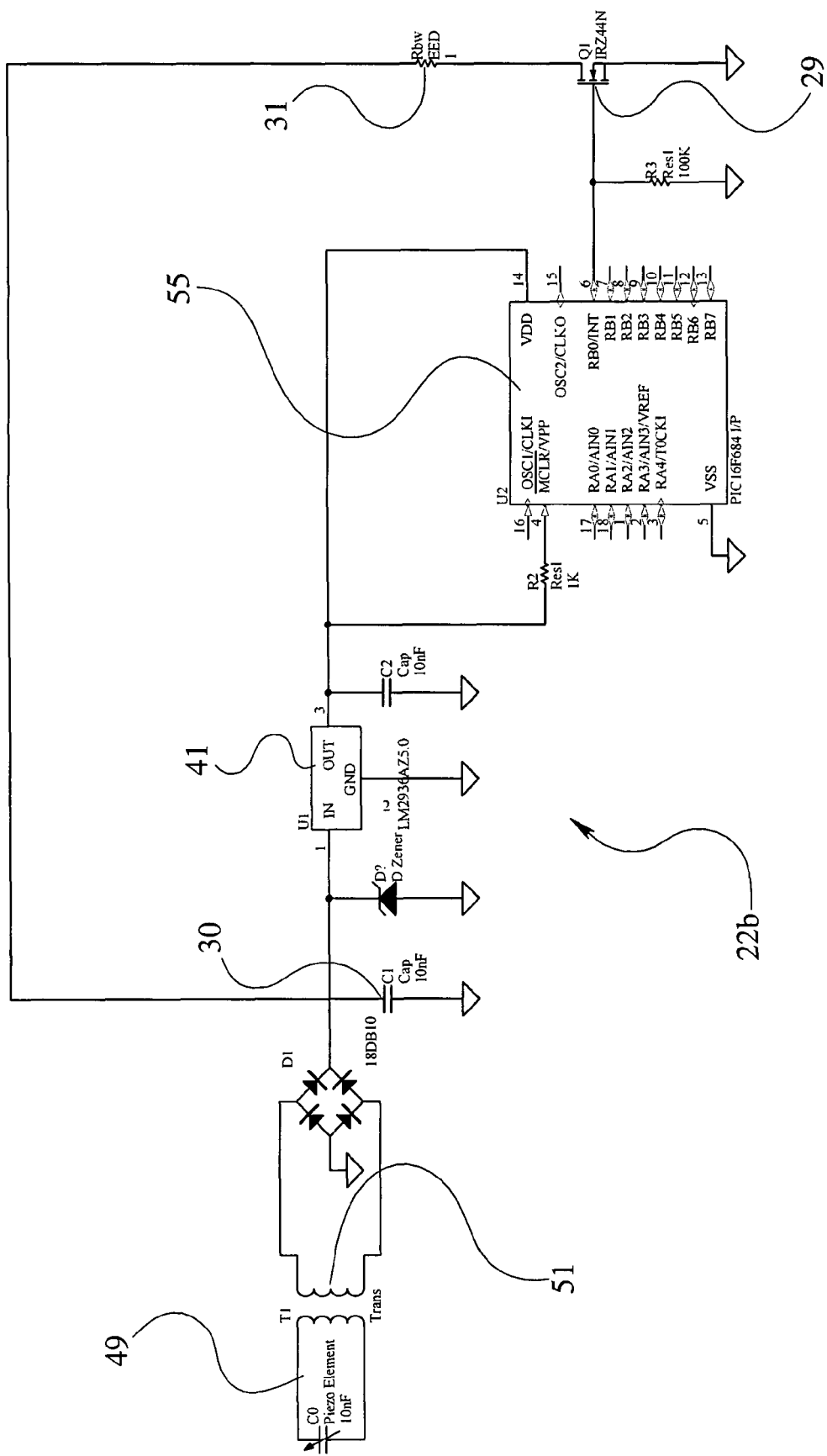
FIG. 3 is a schematic view of an alternate preferred embodiment of the electronics for the time delay module of FIG. 1.

FIGS. 2 and 3, schematically depict the electronics of preferred embodiments 22a and 22b of an efficient piezoelectric-triggered time delay module. In embodiment 22a, there are separate matched pairs of capacitor and piezoelectric transducer, namely logic piezoelectric transducer 37 and logic capacitor 26, and firing piezoelectric transducer 39 and firing capacitor 28. Input to the time delay module 22a causes both piezoelectric transducers to generate electricity, with logic piezoelectric transducer charging logic capacitor 26 and firing piezoelectric transducer 39 charging firing capacitor 28. Microcontroller 45 is powered by the logic capacitor 26 and opens the firing switch 29 after counting down a delay time, sending the electricity in the firing capacitor 28 through initiator 31. A linear regulator 41 regulates the voltage from the capacitor 28 (or capacitor 30 in the embodiment of FIG. 3) to the microcontroller while a temperature sensor 43 measures the temperature of the microcontroller to precisely adjust the microcontroller timing to obtain highly precise time delay. The temperature sensor 43 may be an intrinsic part of the microcontroller, such as a SiLab® model C8051F301.

Piezoelectric Transducers

The transducers 37 and 39 are preferably multi-wafer stacks comprising a number of piezoelectric plates in a very stiff structure with a high capacitance, capable of handling high forces and generating a large amount of charge. It is packaged into the time delay module by sandwiching it between layers of different materials. By selecting materials with the proper combination of stiffness and compressibility, the piezoelectric stack can be made to respond favorably to the dynamic input from the percussive (or similar shock type) input. For example, each stack may consist of three piezoelectric wafers each 6.35 mm in diameter and each made of PZT-based lead zirconate titanate doped (e.g., with niobium or tantalum or other suitable dopant), and each having a $d_{33}$ piezoelectric charge coefficient of >500 (e.g., 550)×$10^{-12}$ m/V, a $g_{33}$ piezoelectric voltage coefficient of >0.015 (e.g., 0.018) Vm/N, and an $e_{33}$ dielectric constant of 3400. (The charge developed by a piezoelectric transducer can be estimated as $d_{33}$ multiplied by the product of the pressure on the transducer and its area, while the voltage developed by the transducer can be estimated as $g_{33}$ multiplied by the product of the pressure on the transducer and its thickness.) The three piezoelectric wafers of the firing piezoelectric transducer 39 may be 2 mm thick each and have a range of Curie points such as −15 F, 25 F and 150 F (where each first noted Curie point corresponds to the wafer closest to the input 21), and the three wafers of the logic piezoelectric transducer 37 may be 1 mm thick each with the same Curie points. The firing piezoelectric transducer 39 should be closest to the input 21, and separated from the logic piezoelectric transducer 37 by an insulator as is well-known in the art, with separate leads directed from each transducer to the respective corresponding capacitor. The piezoelectric transducer for the logic portion may consist of multi-layer (e.g., 20 layers per wafer) ceramic piezoelectric wafers having a high characteristic value of capacitance to capture the charge generated during primer action resulting in a voltage peak of about 50V.

Storage Capacitors

The capacitors 26 and 28 may consist of conventional multi-layer tantalum or ceramic. The separated piezoelectric/capacitor pairing allows optimization of each piezoelectric and capacitor for their intended functions. The impedance of each capacitor is preferably tuned to that of the corresponding piezoelectric transducer, preferably being made of the same materials as the corresponding piezoelectric transducer so the impedance matches over a range of temperatures. Given the specific piezoelectric transducers 37 and 39 just described, a firing capacitor 28 may have a capacitance of 2×$10^{-9}$ F and a logic capacitor 26 may have a capacitance of 800×$10^{-9}$ F. High volumetric energy density anti-ferroelectric capacitors may be used to reduce the circuitry's volume and footprint for a given energy output, such as Pulse Power Capacitors® having a volumetric energy density up to 7 J/cc with voltage ratings of 500V to 2000V marketed by Novacap of Valencia, Calif.

Control Electronics, Firing Switch, and Initiator

Control electronics 27 regulate the voltage produced by the piezoelectric transducers, so variations in primer output do not affect system performance as long as the primer energy exceeds a minimum level required to power the electronics throughout the delay timing and then fire the initiator, and does not exceed the physical strength of the system. The control circuitry 27 includes a voltage regulator 41 and a logic core or microcontroller (45 or 55) plus supporting passive elements such as capacitors and biasing resistors or some protection devices such as transient voltage suppressors (against ESD strikes) and ferrite beads or chips (against EMC/EMI). A low power logic core or microcontroller (e.g., a Microchip° model PIC 12F675 or a Silicon Laboratories® model C8052F301 operating at 2.5V) is preferably used so that current draw (e.g., 1.25 uA average) is low during the delay countdown. Clocking is preferably provided by an internal RC oscillator operating, for example, at 32 kHz. The time delay is preferably factory programmable in 1 ms increments up to a maximum delay of 10 s. (It is noted that the electronics could be embodied in an ASIC or implemented using various semiconductor components). The logic core or microcontroller controls firing by opening a solid state switch (e.g., a high voltage n-MOSFET, silicon controlled rectifier (SCR), or insulated gate bipolar transistor (IGBT)) from the firing capacitor to the initiator 31. Table 1 shows test results of delay time accuracy at room temperature for an embodiment of a time delay module as just described.

TABLE 1

| Measured Timing for a Nominal 1 s Delay Time (s) |
|---|
| 0.999986 |
| 0.999975 |
| 0.999922 |
| 1.000000 |
| 1.000026 |
| 0.999977 |
| 0.999982 |
| 1.000410 |
| 0.999984 |
| 1.000000 |
| 0.999960 |
| 0.999955 |
| 1.000044 |
| Mean = 1.000011 |
| Standard Deviation = 0.000119 (119.3 ppm) |

The initiator 31 is preferably a robust, non-low energy (e.g., 0.5 mJ to 20 mJ all-fire energy) bridgewire type, and can be adapted from a suitable two-pin automotive airbag initiator. Various initiators were tested according to their high voltage firing performance as shown in Table 2. (Wherein "1A/1W" and "CMB" respectively denote a military initiator, and a commercial mining and blasting initiator, commercially available from the assignee of this application, and "AGH/AGI" and "Type F" denote automotive initiators commercially available from the assignee of this application).

TABLE 2

| Types of Initiators and Energy Needed to Fire at 500 V | | |
|---|---|---|
| Initiator Type | Capacitor Charged to 500 V (nF) | Equivalent Energy at 500 V (mJ) |
| 1A/1W | 150 | 18.8 |
| CMB | 50 | 6.3 |
| AGH/AGI | 20 | 2.5 |
| Type F | 5 | 0.6 |

In the alternate preferred embodiment of FIG. 3, a single piezoelectric transducer 49 is employed to charge a single capacitor 30 that both powers the microcontroller 55 and energizes the initiator 31 with its remaining energy after the microcontroller 55 has counted out the delay time. In this embodiment, a tuned transformer 51 is preferably placed between the diode bridge and the capacitor 30 to facilitate impedance-matching between the piezoelectric transducer 49 and the capacitor 30, enabling greater energy extraction at moderately low voltages (e.g., 50V to 100V).

Although the present invention has been described in detail in the context of a preferred embodiment of an efficient piezoelectric-triggered time delay module, one skilled in the art will appreciate that numerous variations, modifications, and other applications are also within the scope of the present invention. For example, the invention could be employed in applications such as powering various selected electronics in smart armaments and ordnances (missile, mortars, bombs, torpedoes) in response to sudden acceleration. The invention could even be utilized in shoes or backpacks, for example, to power personal electronics or communication packs. Finally, a pyroelectric effect could alternately or additionally be used to generate electricity, with an induced temperature change generating electricity in the transducer. Thus, the foregoing detailed description is not intended to limit the invention in any way, which is limited only by the following claims and their legal equivalents.

What is claimed is:

1. An efficient piezoelectric-triggered time delay module for use with a percussive primer or shock device, comprising:
    a) a logic capacitor and a firing capacitor that are separate from each other;
    b) control electronics;
    c) a firing switch;
    d) an initiator; and,
    e) two piezoelectric transducers that respectively correspond to said logic capacitor and to said firing capacitor; wherein
    each said piezoelectric transducer is impedance-matched to the respective corresponding capacitor and is made of the same material as the respective corresponding capacitor resulting in a close tracking of impedance over a range of temperatures.

2. The time delay module of claim 1, wherein said capacitors are rated at greater than 250V.

3. The time delay module of claim 1, wherein said piezoelectric transducers comprise a $d_{33}$ greater than $500 \times 10^{-12}$ m/V.

4. The time delay module of claim 1, wherein said piezoelectric transducers comprise a $g_{33}$ greater than 0.015 Vm/N.

5. The time delay module of claim 3, wherein said piezoelectric transducers comprise a $g_{33}$ greater than 0.015 Vm/N.

6. The time delay module of claim 1, wherein said piezoelectric transducers have multiple wafers.

7. The time delay module of claim 6, wherein each of said multiple wafers of said piezoelectric transducers have a different Curie point.

8. The time delay module of claim 1, wherein said piezoelectric transducers include a tuned transformer.

9. The time delay module of claim 1, wherein said piezoelectric transducers are also capable of generating electricity pyroelectrically.

10. An efficient piezoelectric-triggered time delay module for use with a percussive primer or shock device, comprising:
    a) at least one piezoelectric transducer;
    b) at least one storage capacitor;
    c) control electronics;
    d) a firing switch; and,
    e) an initiator;
wherein said at least one storage capacitor is impedance-matched to said at least one piezoelectric transducer and is made of the same material as the at least one storage capacitor resulting in a close tracking of impedance over a range of temperatures.

11. The time delay module of claim 10, wherein said at least one piezoelectric transducer includes a piezoelectric transducer having multiple wafers.

12. The time delay module of claim 10, wherein said at least one storage capacitors is rated at greater than 250V.

13. The time delay module of claim 10, wherein said at least one piezoelectric transducer comprises a $d_{33}$ greater than $500 \times 10^{-12}$ m/V.

14. The time delay module of claim 10, wherein said at least one piezoelectric transducer comprises a $g_{33}$ greater than 0.015 Vm/N.

15. The time delay module of claim 13, wherein said at least one piezoelectric transducer comprises a $g_{33}$ greater than 0.015 Vm/N.

16. The time delay module of claim 11, wherein each of said multiple wafers of said at least one piezoelectric transducer have a different Curie point.

17. The time delay module of claim 10, wherein said at least one piezoelectric transducer includes a tuned transformer.

18. The time delay module of claim 10, wherein said at least one piezoelectric transducer is also capable of generating electricity pyroelectrically.

* * * * *